(12) United States Patent
Yamazaki et al.

(10) Patent No.: US 11,757,236 B2
(45) Date of Patent: Sep. 12, 2023

(54) SHIELD MEMBER, SHIELD UNIT, AND CONNECTOR MODULE

(71) Applicant: HOSIDEN CORPORATION, Osaka (JP)

(72) Inventors: Masakazu Yamazaki, Osaka (JP); Hayato Kondo, Osaka (JP)

(73) Assignee: Hosiden Corporation, Osaka (JP)

( * ) Notice: Subject to any disclaimer, the term of this patent is extended or adjusted under 35 U.S.C. 154(b) by 189 days.

(21) Appl. No.: 17/332,308

(22) Filed: May 27, 2021

(65) Prior Publication Data

US 2021/0384680 A1    Dec. 9, 2021

(30) Foreign Application Priority Data

Jun. 3, 2020 (JP) ................. 2020-096992

(51) Int. Cl.
*H01R 13/6597* (2011.01)
*H01R 12/70* (2011.01)
(Continued)

(52) U.S. Cl.
CPC ..... *H01R 13/6597* (2013.01); *H01R 12/7082* (2013.01); *H01R 12/716* (2013.01);
(Continued)

(58) Field of Classification Search
CPC ............ H01R 13/6597; H01R 12/7082; H01R 12/716; H01R 13/6215; H01R 13/6581; H01R 24/542; H01R 13/516; H01R 13/6583; H01R 13/748; H01R 13/6596; H01R 24/50; H01R 13/6585; H01R 13/502; H01R 13/533; H01R 13/6473; H04N 23/52; H04N 23/57
See application file for complete search history.

(56) References Cited

U.S. PATENT DOCUMENTS

2014/0041938 A1\*  2/2014  Corbett ................ H01R 4/5025
                                                                          174/75 R
2018/0287306 A1   10/2018  Grimes et al.

FOREIGN PATENT DOCUMENTS

| JP | 2007-127206 A | 5/2007 |
| JP | 2014-137913 A | 7/2014 |
| JP | 2019-67740 A | 4/2019 |

OTHER PUBLICATIONS

European Search Report from European Patent Application No. 21176189.5 dated Oct. 22, 2021.

\* cited by examiner

*Primary Examiner* — Abdullah A Riyami
*Assistant Examiner* — Justin M Kratt
(74) *Attorney, Agent, or Firm* — Dilworth & Barrese, LLP

(57) ABSTRACT

The shield member includes a plurality of first elastic portions made of a conductive material and arranged annularly in a plate shape at an inner circumferential part of the shield member; a plurality of second elastic portions arranged annularly at an outer circumferential part of the shield member; and an intermediate portion between the plurality of first elastic portions and the plurality of second elastic portions. The plurality of first elastic portions are defined by a plurality of first slits each extending from an inner circumferential edge of the shield member in a radial direction of the shield member. The plurality of second elastic portions are defined by a plurality of second slits each extending from an outer circumferential edge of the shield member in the radial direction.

19 Claims, 9 Drawing Sheets

(51) Int. Cl.
*H01R 12/71* (2011.01)
*H01R 13/621* (2006.01)
*H01R 13/6581* (2011.01)
*H01R 24/54* (2011.01)
H01R 13/516 (2006.01)
H01R 13/502 (2006.01)
H04N 23/52 (2023.01)
H01R 13/6585 (2011.01)
H01R 13/533 (2006.01)
H04N 23/57 (2023.01)
H01R 13/6473 (2011.01)

(52) U.S. Cl.
CPC ..... *H01R 13/6215* (2013.01); *H01R 13/6581* (2013.01); *H01R 24/542* (2013.01); H01R 13/502 (2013.01); H01R 13/516 (2013.01); H01R 13/533 (2013.01); H01R 13/6473 (2013.01); H01R 13/6585 (2013.01); H04N 23/52 (2023.01); H04N 23/57 (2023.01)

SHIELD MEMBER, SHIELD UNIT, AND CONNECTOR MODULE

CROSS REFERENCE TO RELATED APPLICATION

This application is based on and claims priority under 35 U.S.C. Section 119 to Japanese Patent Application No. 2020-96992 filed on Jun. 3, 2020, the entire content of which are incorporated herein by reference.

TECHNICAL FIELD

This disclosure relates to a shield member, a shield unit, and a connector module.

BACKGROUND ART

Conventionally, there is known a connector module electrically connectable to a connection target instrument such as a camera module (see e.g. Japanese Unexamined Patent Application No. 2019-67740 publication). The connector module disclosed in Japanese Unexamined Patent Application No. 2019-67740 publication includes a connector case configured to be fixed to a main body case of the connection target instrument and a connector accommodated in the connector case ("terminal module" in the document). The connector includes a contact ("center conductor" in the document), an insulator holder supporting the contact inserted therein ("insulator holder" in the document), a conductive tubular shell ("conductive shell" in the document) surrounding the outer circumferential portion of the holder, and a conductive shield case placed in engagement with the tubular shell for shielding against external electromagnetic waves. The shield case includes, as projections, a plurality of elastic portions engageable with the outer circumferential portion of the tubular shell. These elastic portions function to maintain good contact between the tubular shell and the shield case for high shielding performance.

Japanese Unexamined Patent Application No. 2007-127206 discloses a connector module electrically connectable to a connection target instrument having a circuit board. The connector module disclosed in Japanese Unexamined Patent Application No. 2007-127206 includes a seal device configured to be fixed to a case of the connection target instrument and a connector fixed to the seal device. The seal device includes an outer circumferential annular member adhesively secured to the case, an inner annular member adhesively secured to the outer circumference of the connector, and a flexible thin film member fixedly attached to the outer circumferential annular member and the inner annular member. The document discloses that as the flexible thin film member fills the gap between the connector and the case, displacement (misalignment) between the case and the connector can be absorbed.

Japanese Unexamined Patent Application No. 2014-137913 discloses a connector module ("floating connector" in the document) electrically connectable to a connection target instrument having a coaxial plug. The connector module disclosed in Japanese Unexamined Patent Application No. 2014-137913 includes a tubular outer shell configured to be fixed to a case and a movable tubular shell configured to be movably assembled with the tubular outer shell via a seal member. The document discloses that as the movable tubular shell is movable relative to the tubular outer shell, fitting connection is possible even with displacement in the insertion position of the coaxial plug.

SUMMARY

The connector module disclosed in Japanese Unexamined Patent Application No. 2019-67740 publication includes a conductive shield case engageable with a tubular shell for providing shield against external electromagnetic waves, so it is possible to secure high shielding performance Yet, this module has room for improvement in terms of absorption of displacement between the connection target instrument and the connector. The connector module disclosed in Japanese Unexamined Patent Application No. 2007-127206 is capable of absorbing displacement between the connection target instrument and the connector, thanks to the flexible thin film member. Yet, this flexible thin film member is problematic in its strength. The connector module disclosed in Japanese Unexamined Patent Application No. 2014-137913 is capable of absorbing displacement between the connection target instrument and the connector as the movable tubular shell is movable relative to the tubular outer shell. Yet, there is a risk of the movable tubular shell repeatedly coming into contact with the tubular outer shell due to e.g. vibration, which causes a durability problem. Moreover, this connector module disclosed in Japanese Unexamined Patent Application No. 2014-137913 is incapable of maintaining a fixed distance between the movable tubular shell and the tubular outer shell. It is thus difficult to achieve impedance matching, with the result of possibility of giving adverse influence to high frequency propagation performance.

The above circumstances have led to a demand for a shield member, a shield unit, and a connector module each of which allows easy alignment with a connection target instrument.

In view of the above circumstances, a shield member of an aspect includes: a plurality of first elastic portions made of a conductive material and arranged annularly in a plate shape at an inner circumferential part of the shield member; a plurality of second elastic portions arranged annularly at an outer circumferential part of the shield member; and an intermediate portion between the plurality of first elastic portions and the plurality of second elastic portions, wherein the plurality of first elastic portions are defined by a plurality of first slits each extending from an inner circumferential edge of the shield member in a radial direction of the shield member, and the plurality of second elastic portions are defined by a plurality of second slits each extending from an outer circumferential edge of the shield member in the radial direction.

The shield member of this aspect includes a plurality of first elastic portions and a plurality of second elastic portions. This allows, for example, the respective positions of (i) a tubular shell electrically connected to the plurality of first elastic portions and (ii) a shield cover electrically connected to the plurality of second elastic portions to be changed relative to each other while maintaining the electric connection through elastic deformation of the first elastic portions and/or the second elastic portions. With this arrangement, even if the shield member is, for example, vibrated, the first elastic portions and/or the second elastic portions are elastically deformed to absorb the shock. This allows the tubular shell and the shield cover to have increased durability.

A shield member as a preferable aspect is further arranged such that the plurality of first elastic portions each include a base end part having a first curved part curved relative to and continuous with the intermediate portion, the plurality of second elastic portions each include a base end part having a second curved part curved relative to and continuous with the intermediate portion, and the first curved part has a first central angle, and the second curved part has a second central angle, the first central angle being larger than the second central angle.

The shield member of this aspect is arranged such that the first curved part is curved more than the second curved part relative to the intermediate portion. This allows each first elastic portion having a first curved part and each second elastic portion having a second curved part to cause respective contact pressures in respective directions different from each other. This in turn allows, for example, (i) the plurality of first elastic portions to become electrically connected to a side face portion of the tubular shell and (ii) the plurality of second elastic portions to become electrically connected to a flat face portion of the shield cover.

A shield member as a preferable aspect is further arranged such that the first curved part is curved in a direction identical to a direction in which the second curved part is curved.

The shield member of this aspect is arranged such that the plurality of first curved parts are curved in a direction identical to the direction in which the plurality of second curved parts are curved. This means that each first elastic portion having a first curved part extends in a direction identical to the direction in which each second elastic portion having a second curved part extends. This allows the shield member to have a small thickness as a whole, as compared to a case in which each first curved part is curved in a direction opposite to the direction in which each second curved part is curved.

A shield member as a preferable aspect is further arranged such that the plurality of second elastic portions each include a leading end portion curved in a direction opposite to the direction in which the second curved part is curved relative to the intermediate portion.

The shield member of this aspect is arranged such that the plurality of second elastic portions each include a leading end portion curved in a direction opposite to the direction in which each second curved part is curved relative to the intermediate portion. Thus, bringing the curved portion of the leading end portion into contact with, for example, a flat face portion of a shield cover allows the shield member and the shield cover to be moved smoothly relative to each other while remaining in contact with each other.

A shield member as a preferable aspect is further arranged such that the plurality of first slits each have a first slit width, and the plurality of second slits each have a second slit width, each of the first slit width and the second slit width being not larger than twice a plate thickness of the shield member.

The shield member of this aspect is arranged such that the plurality of first slits and the plurality of second slits have respective slit widths that are not larger than twice the plate thickness and that are thus small. The first elastic portions and the second elastic portions are thus large in area in a plan view. This increases the area of contact between the first elastic portions and a contact target thereof and the area of contact between the second elastic portions and a contact target thereof, thereby ensuring stable electric connection.

Further, the shield member is large in area. This allows the impedance characteristic to be stable during high-frequency propagation, and reduces emission of noise to the outside of the shield member. In addition, the above arrangement increases the shielding effect, which reduces the influence of outside noise on the high-frequency current.

A shield member as a preferable aspect is further arranged such that the intermediate portion is in an annular shape, and has a reinforcement portion along an entire circumference thereof.

The shield member of this aspect is arranged such that the annular intermediate portion has a reinforcement portion along the entire circumference thereof. This increases the strength (rigidity) of the intermediate portion. The shield member will thus not become deformed even if a large force has been generated at the first elastic portions and/or the second elastic portions as a result of having a high rate of spring or becoming elastically deformed by a large amount. With the above arrangement, even if, for instance, each first elastic portion has come into contact with the tubular shell with a high contact pressure, the shield member, which includes an intermediate portion with a high strength, will not become deformed by the contact pressure. This allows the first elastic portions to maintain a high contact pressure against the tubular shell.

In view of the above circumstances, a shield unit of an aspect includes: an electrically conductive tubular shell; a shield member described above, the shield member being fitted around the tubular shell such that the plurality of first elastic portions of the shield member are in contact with the tubular shell for electric connection of the shield member with the tubular shell; and an electrically conductive shield cover with which the plurality of second elastic portions of the shield member are capable of coming into contact.

The shield member of this aspect is in an annular shape with a uniform distance between the inner end of each first elastic portions and the outer end of each second elastic portion, and is arranged such that the plurality of first elastic portions are electrically connected to the tubular shell and that the plurality of second elastic portions are electrically connected to the shield cover. The shield member thus ensures high shielding performance and stable impedance characteristic when, for instance, a conductor is placed at the center of the tubular shell, and a high-frequency current is flown through the conductor and the shield unit.

In view of the above circumstances, a connector module of an aspect is a connector module electrically connectable to a connection target instrument, the connector module including: a connector case fixable with use of a fastener member to a main body case containing the connection target instrument; and a connector fitted in the connector case, wherein the connector includes: an electrically conductive contact; an electrically insulating holder in which the contact is fitted and which supports the contact; an electrically conductive tubular shell surrounding an outer surface of the holder; an electrically insulating housing in which the tubular shell is fitted and which supports the tubular shell; a shield member described above, the shield member being fitted around the tubular shell such that the plurality of first elastic portions of the shield member are elastically deformed and in contact with the tubular shell for electric connection of the shield member with the tubular shell; and an electrically conductive shield cover against which the plurality of second elastic portions of the shield member are capable of being pressed, wherein with the connector case fixed to the main body case with use of the fastener member, the plurality of second elastic portions of the shield member are elastically deformed and pressed against the shield cover for electric connection of the shield member with the shield cover.

The shield member of this aspect includes a plurality of first elastic portions and a plurality of second elastic portions. This allows the respective positions of (i) a tubular shell electrically connected to the plurality of first elastic portions and (ii) a shield cover electrically connected to the plurality of second elastic portions to be changed relative to each other while maintaining the electric connection through elastic deformation of the first elastic portions and/or the second elastic portions. With this arrangement, even if the shield member is, for example, vibrated, the first elastic portions and/or the second elastic portions are elastically deformed to absorb the shock. This allows the tubular shell and the shield cover to have increased durability.

The shield member of this aspect includes second elastic portions capable of being pressed against the shield cover. With the connector case fastened to the main body case with use of a fastener member, the second elastic portions of the shield member are elastically deformed and pressed against the shield cover for electric connection of the shield member with the shield cover. In other words, before the connector case becomes fastened to the main body case of a connection target instrument with use of a fastener member, the second elastic portions of the shield member are in no contact with the shield cover or even if in contact therewith, not pressed against the shield cover with a large force. As a result, the shield member is smoothly movable relative to the shield cover. Even if the respective axes of a connection target instrument and the connector are displaced from each other at the time of attachment of the connection target instrument to the connector, moving the shield member (the first elastic portions of which are elastically deformed and in contact with the tubular shell covering the contact) together with the tubular shell allows the displacement to be corrected for alignment.

With the connector case fixed to the main body case with use of a fastener member, the second elastic portions of the shield member are elastically deformed and pressed against the shield cover for electric connection of the shield member with the shield cover. This allows the connector module of this aspect to ensure high shielding performance.

As described above, it has now become possible to provide a connector module that is highly durable and that also allows easy alignment with a connection target instrument while maintaining high shielding performance.

DESCRIPTION OF EMBODIMENTS

Figure 1:
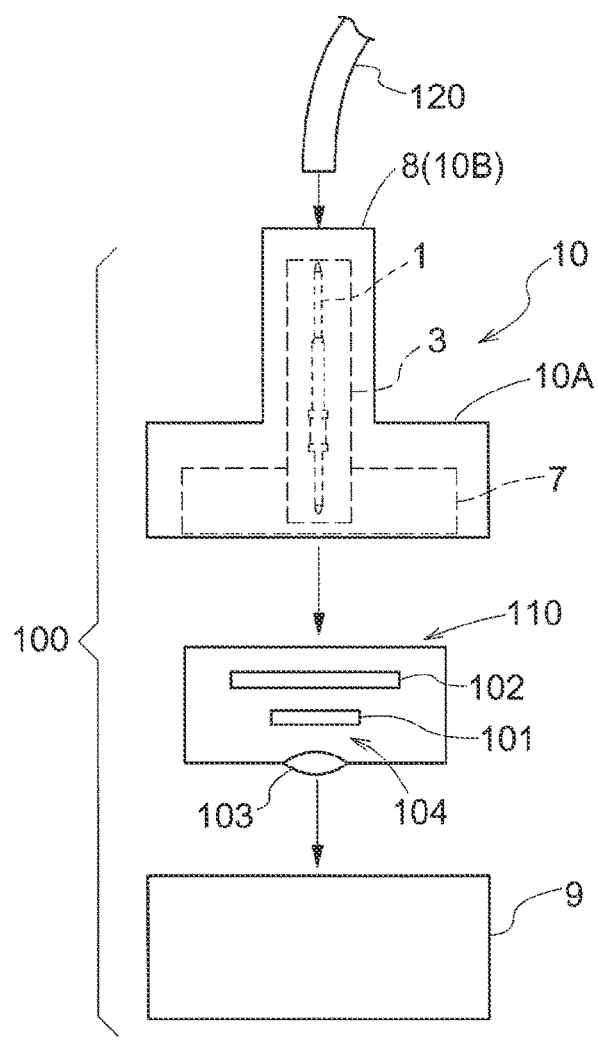
FIG. 1 is a view schematically showing an arrangement of a camera unit (vehicle-mounted camera).

Next, an embodiment of a connector module relating to this disclosure will be explained with reference to the accompanying drawings. For this embodiment, as schematically shown in FIG. 1, there will be explained, as an example thereof, a connector module 10 to be used in a camera unit 100 (vehicle-mounted camera) configured to be mounted in a vehicle. It is understood, however, that the invention is not limited to the following embodiment, but various modifications will be possible within a range not deviating from the essence thereof.

As shown in FIG. 1, the camera unit 100 includes a camera module 110 (an example of "connection target instrument"), the connector module 10 and an insulator main body case 9 formed of a resin or the like for accommodating the camera module 110 therein. The camera module 110 includes, at least, an image sensor 101, an electronic circuit 102 for controlling driving of the image sensor 101 and processing image signals outputted from the image sensor 101, and an optical system 104 having a lens 103 for condensing light onto the image sensor 101. This camera unit 100 can be used also for other applications than vehicle mounting application (e.g. can be mounted on a bicycle, a drone, etc.)

The camera unit 100 is electrically connected to an image processing device (not shown) or a monitor device (not shown) via a coaxial cable 120. The coaxial cable 120 is a cable configured such that an inner conductor and an outer conductor are arranged coaxially across a dielectric (insulator) therebetween. The inner conductor is responsible for signal transmission and the outer conductor functions as a shield for suppressing influence of electromagnetic waves to the inner conductor. For this embodiment, the inner conductor is responsible also for supplying power from the image processing device or the monitor device to the image sensor 101 and the electronic circuit 102 of the camera unit 100 and also for outputting video signals outputted from the image sensor 101 and the electronic circuit 102 to the image processing device and the monitor device.

The image sensor 101 of the camera module 110 is a CCD (Charge Coupled Device) sensor or a CIS (CMOS Image Sensor). The lens 103 is not limited to a single sheet of lens, but may be a plurality of sheets of lens. The electronic circuit 102 includes a clock driver for driving the image sensor 101, an A/D converter for converting analog signals outputted from the image sensor 101 to digital signals, and so on.

The electronic circuit 102 is configured as a circuit board including electronic devices or components mounted on a single printed board or a plurality of printed boards. In a case where the electronic circuit 102 includes a plurality of circuit boards, a flexible board may be used for electric connection between adjacent circuit boards. On the circuit board on which the electronic circuit 102 is formed, a receptacle A (see FIG. 5) is mounted. The connector module 10 is electrically connected not only to the receptacle A, but also to the coaxial cable 120 to establish electric connection between the electronic circuit 102 and the coaxial cable 120.

Figure 2:
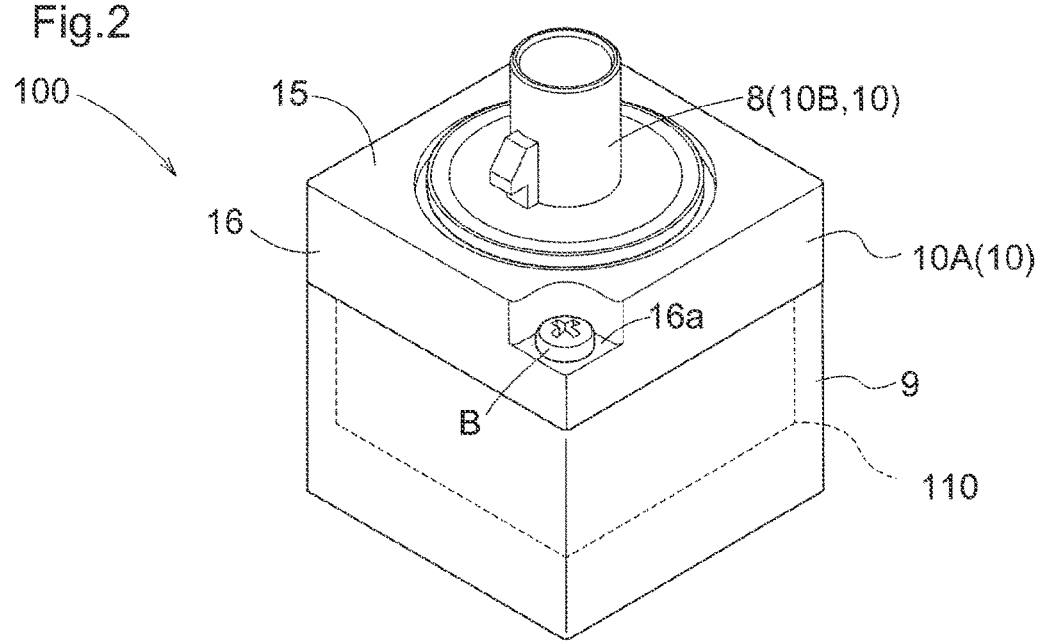
FIG. 2 is an overall perspective view of a camera unit.
Figure 3:
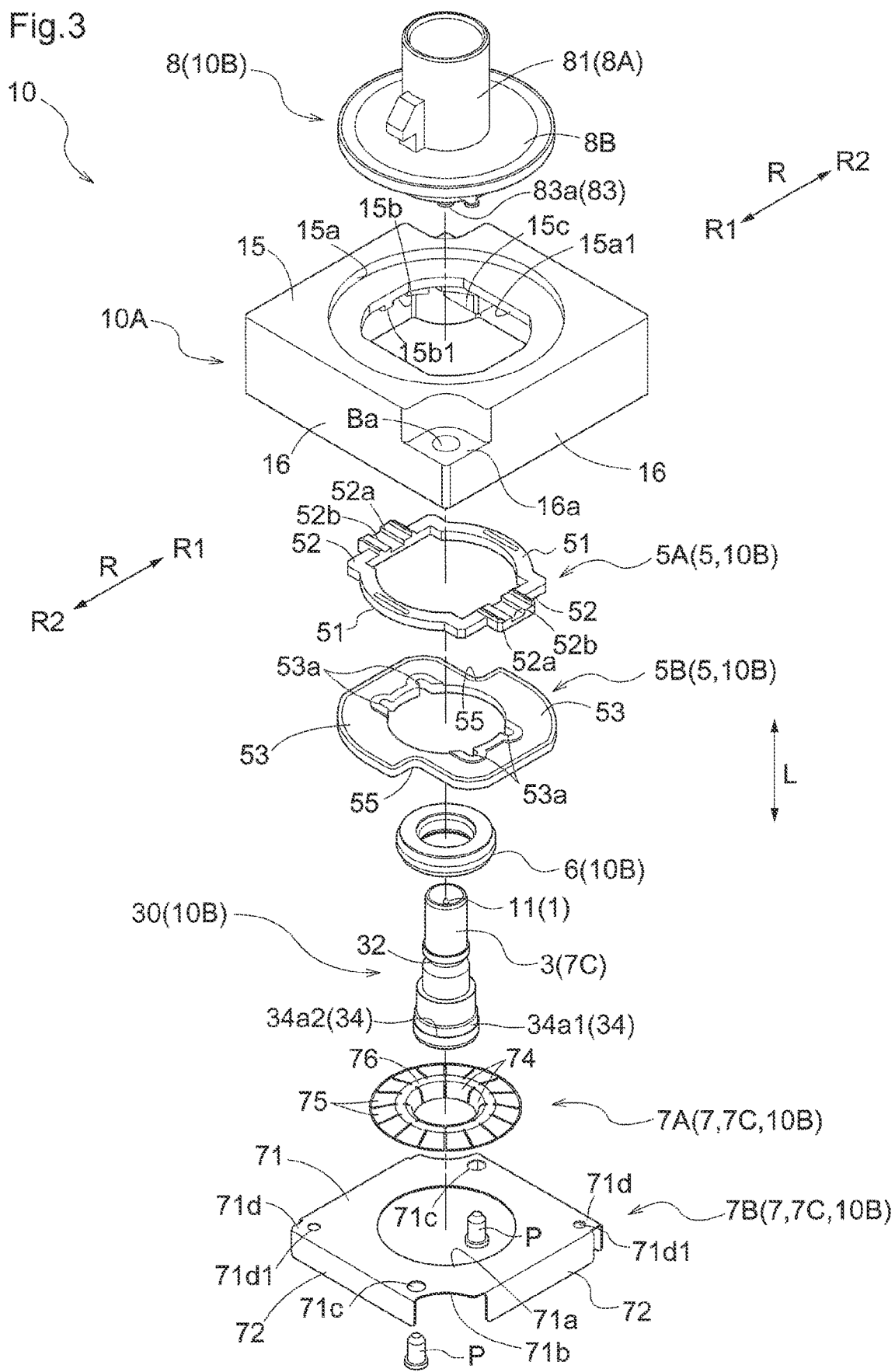
FIG. 3 is an exploded perspective view of a connector module.
Figure 4:
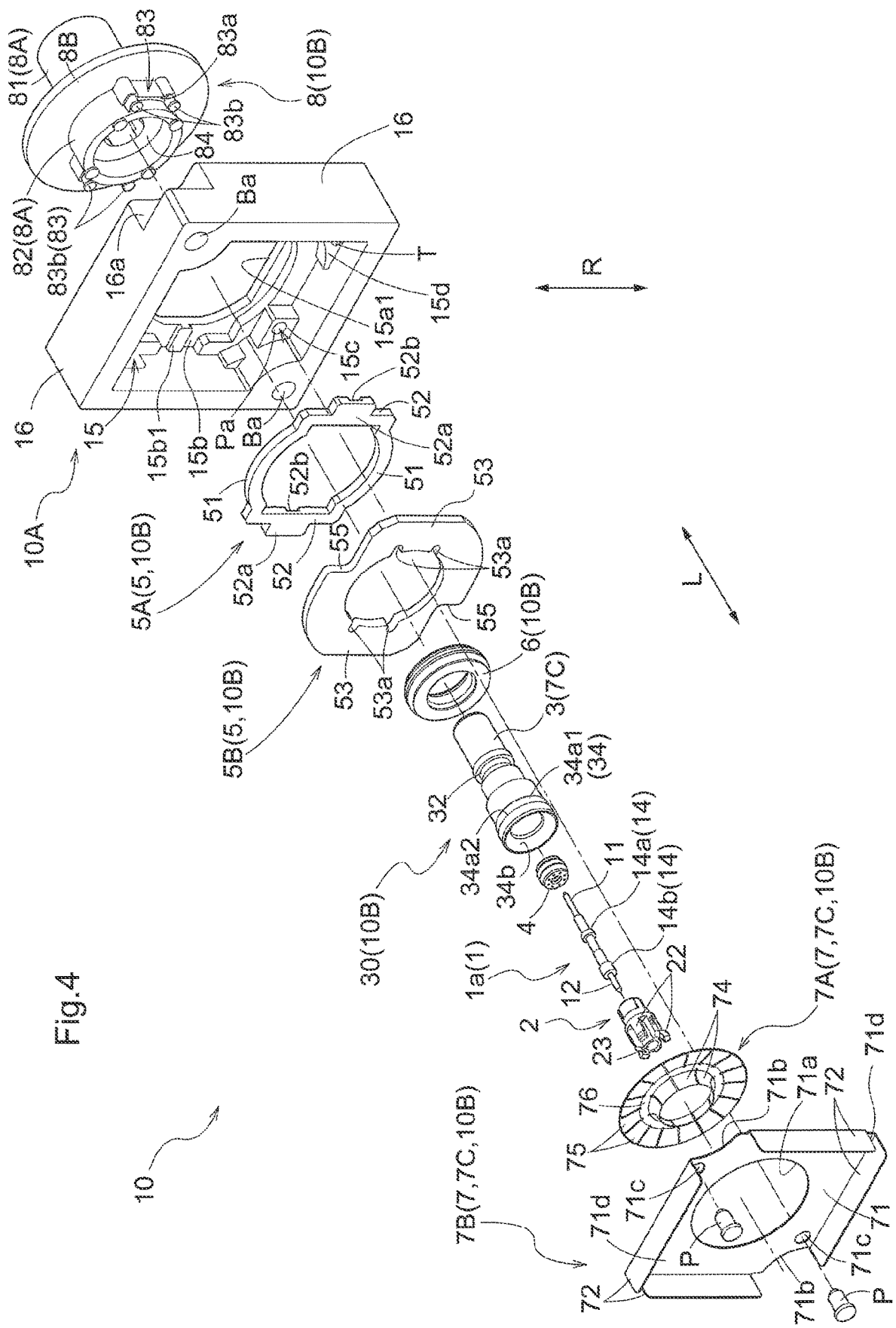
FIG. 4 is an exploded perspective view of a connector module.
Figure 5:
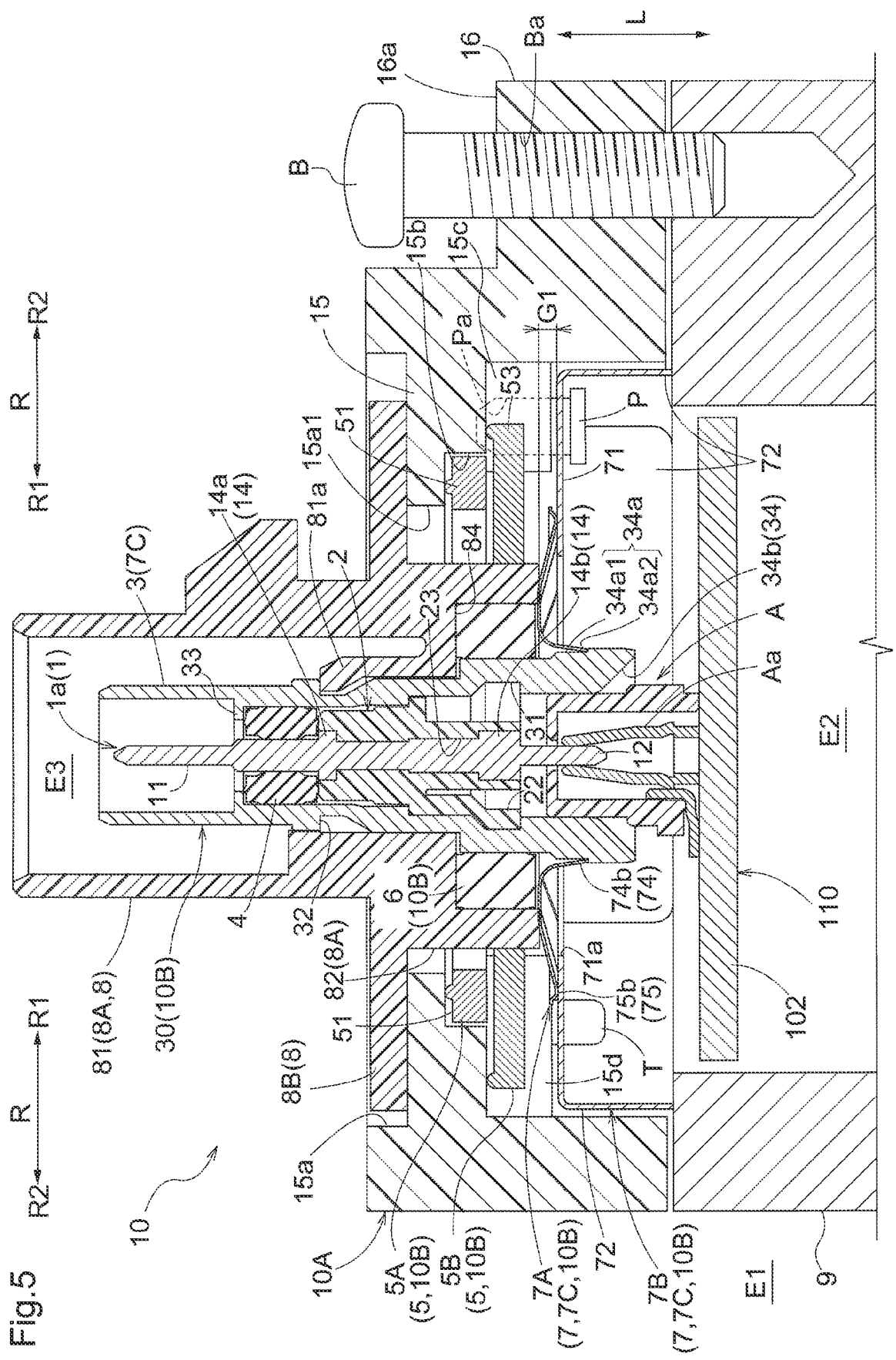
FIG. 5 is a vertical section of a connector module.

FIG. 2 shows an overall perspective view of the camera unit 100. FIGS. 3-4 show exploded perspective views of the connector module 10. FIG. 5 shows a vertical section of the connector module 10. As shown in FIG. 2, the connector module 10 includes a connector case 10A and a connector 10B inserted in the connector case 10A. The connector case 10A and the main body case 9 are fixed to each other via a plurality of (two for this embodiment) bolts B (an example of "fastener member"). As shown in FIG. 3, the connector 10B includes a housing 8, a terminal module 30, an outer seal member 6, a shield case 7 and a rotation-preventing mechanism 5 (an example of "rotation-preventing member"). Further, as shown in FIG. 4, the terminal module 30 includes a center conductor 1 (or a core conductor; an example of "conductor"), a holder 2, a tubular shell 3 and an inner seal member 4. The terminal module 30 has similar functions to those of the coaxial cable 120. The center conductor 1 corresponds to the inner conductor of the coaxial cable 120, the holder 2 corresponds to the dielectric (insulator) of the coaxial cable 120 and the tubular shell 3 corresponds to the outer conductor of the coaxial cable 120.

As shown in FIG. 5, the connector case 10A is a case for accommodating the connector 10B, whereas the housing 8 of the connector 10B is s case for accommodating the terminal module 30 and the outer seal member 6. As shown in FIG. 2, the connector case 10A, in the camera unit 100, is to be located rearwardly of the camera module 110 (upwardly in FIG. 2). For this reason, it may sometimes be called a "rear case". In a like manner, the main body case 9 may sometimes be called a "front case" relative to the rear case in the camera unit 100. The connector case 10A in which the housing 8 is inserted and fixed, and the main body case 9 are fastened to each other via the plurality of bolts B, forming therein an accommodating space for the terminal module 30, the outer seal member 6, the shield case 7, the rotation-preventing mechanism 5 and the receptacle A (see also FIG. 5).

As shown in FIG. 5, the shield case 7 shields an inner space E2 of the shield case 7 against electromagnetic waves propagated through an outer space E1 of the shield case 7. More particularly, the shield case 7 covers at least a part of the receptacle A of the camera module 110, thus shielding the electronic circuit 102 against the electromagnetic waves such as electromagnetic noise. This shield case 7 is connected to the ground (GND) of the electronic circuit 102. The outer conductor of the coaxial cable 120 described above is electrically connected to the tubular shell 3. As will be described later herein, the shield case 7 and the tubular shell 3 are electrically connected to each other. Therefore, when the shield case 7 is electrically connected to the ground of the electronic circuit 102, the tubular shell 3 and the outer conductor of the coaxial cable 120 are also electrically connected to the ground of the electronic circuit 102.

Next, with reference to FIGS. 2-9, the connector module 10 relating to the first embodiment will be described in greater details.

As described above, the connector module 10 includes the connector case 10A and the connector 10B. The connector 10B includes the housing 8, the terminal module 30, the outer seal member 6, the shield case 7 and the rotation-preventing mechanism 5. Further, the terminal module 30 includes the center conductor 1, the holder 2, the tubular shell 3 and the inner seal member 4.

As shown in FIGS. 4-5, the center (core) conductor 1 is a linear conductor for signal transmission. For this embodiment, the center conductor 1 is constituted solely of a linear portion 1a. The extension direction of the center conductor 1 will be referred to as a first direction L herein. Further, the direction orthogonal to the first direction L will be referred to as a radial direction R; and in this radial direction R, the side toward the center conductor 1 will be referred to as a radial inner side R1 and the side away from the center conductor 1 will be referred to as a radial outer side R2.

The holder 2 is a cylindrical member comprised of a cylindrical insulator defining at the center thereof a thorough hole 23 through which the center conductor 1 extends and which supports the center conductor 1 inserted therein. The holder 2 is formed of an insulating (non-conductive) material such as a resin in order to insulate the center conductor 1 from the outside. The length of the holder 2 in the first direction L is shorter than that of the center conductor 1. Therefore, the holder 2 supports the center conductor 1 by covering a center portion 14 of the center conductor 1 in the first direction L. Namely, opposed ends of the center conductor 1 are not covered by the holder 2, but exposed to present a first terminal portion 11 and a second terminal portion 12, respectively. The center conductor 1 is disposed such that the first terminal portion 11 is on the side of the coaxial cable 120 and that the second terminal portion 12 is on the side of the camera module 110 (on the side of the receptacle A). Though FIG. 4 shows an exploded perspective view for the sake of convenience, the center conductor 1 is insert-molded in the holder 2. At opposed end portions of the center portion 14 covered by the holder 2, there are formed a first annular protruding portion 14a and a second annular protruding portion 14b which protrude to the radial outer side R2. With the above-described integral arrangement of forming the annular protruding portions 14a and 14b on opposite sides of the center portion 14 of the center conductor 1 in the first direction L and insert-molding this center portion 14 in the holder 2, accidental detachment of the center conductor 1 from the holder 2 can be prevented reliably. Further, as compared with the outside diameter of the center portion 14, the respective outside diameters of the first terminal portion 11 and the second terminal portion 12 are set smaller. As described above, the linear portion 1a of the center conductor 1 is constituted of the first terminal portion 11, the second terminal portion 12 and the center portion 14. The center conductor 1 may have only either one of the first annular protruding portion 14a and the second annular protruding portion 14b. Further, the first terminal portion 11 or the second terminal portion 12 may be formed in a curved shape.

The holder 2 includes, at an end portion on the side of the second terminal portion 12, a plurality of (three for this embodiment) elastically deformable protruding pieces 22 that flare out to the radial outer side R2 toward the second terminal portion 12. These protruding pieces 22 are constituted of cantilever beam-like arms each having a free end on the side of the second terminal portion 12. As the holder 2 is progressively inserted into the tubular shell 3, the protruding pieces 22 are elastically deformed to the radial inner side R1 and will reach a first engaging recess portion 31 of the tubular shell 3 (described later), after which the protruding pieces 22 will return to the radial outer side R2, whereby engagement is established between the protruding pieces 22 and the first engaging recess portion 31 of the tubular shell 3. Thus, assembly between the holder 2 and the tubular shell 3 is easy, and the engagement between the protruding pieces 22 and the first engaging recess portion 31 prevents inadvertent detachment of the holder 2 from the tubular shell 3.

The tubular shell 3 is a cylindrically shaped conductor member surrounding the radial outer side R2 of the holder 2 and includes a tubular end portion 34 protruding from the housing 8 (i.e. not covered by the housing 8). In the inner circumferential face of this tubular end portion 34, there is formed a tapered face 34b whose diameter progressively increases toward the opening. The tubular shell 3 is formed of metal. In the tubular shell 3, at a part thereof on the side of the first terminal portion 11, there is formed an annular extension portion 33 extending in an annular form from the inner circumferential face to the radial inner side R1. Further, in the tubular shell 3, at a part thereof on the side of the second terminal portion 12, there is formed the first engaging recess portion 31 receded in the annular form from the inner circumferential face to the radial outer side R2. And, as described above, with this first engaging recess portion 31, the plurality of protruding pieces 22 of the holder 2 will come into engagement. With this engagement, the holder 2 is fixed to the tubular shell 3. As this first engaging recess portion 31 is bottomed and closed on the side of the radial outer side R2, intrusion of electromagnetic noise to the holder 2 side is prevented. The first engaging recess portion 31 for this embodiment is formed by carrying out a cutting work in the inner circumferential face of the tubular shell 3. Further, in the tubular shell 3, there is also formed a bottomed, second engaging recess portion 32 receded in an annular form from the outer circumferential face near the center in the first direction L to the radial inner side R1. As this second engaging recess portion 32 comes into engagement with a plurality of engaging pawls 81a (described later) of the housing 8, inadvertent detachment of the tubular shell 3 from the housing 8 is prevented. Still further, at the tubular end portion 34 of the tubular shell 3, there is formed a bottomed, third engaging recess portion 34a receded in an annular form from the outer circumferential face to the radial inner side R1.

The inner seal member 4 serves to provide sealing for preventing liquid or the like from entering the inside of the terminal module 30 acting as a coaxial cable. The inner seal member 4 is an annular-shaped member having elasticity (elastic member). The inner seal member 4 is such that one side face thereof in the first direction L is retained by the annular extension portion 33 and the other side face thereof is retained by the end face of the holder 2 in the first direction L.

The terminal module 30 is arranged such that the inner seal member 4 has a first side in contact with the annular extension portion 33 and a second side in contact with the holder 2 supporting the center conductor 1. The holder 2 is arranged such that the protruding pieces 22 are engaged with the first engaging recess portion 31 of the tubular shell 3. As described above, in the terminal module 30, the inner seal member 4 and the holder 2 are disposed at specified positions along the first direction L as being sandwiched between the annular extension portion 33 and the protruding pieces 22 of the holder 2. The terminal module 30 configured as above will be assembled with the housing 8 as being inserted toward a cylindrical space E3 of the housing 8.

As shown in FIGS. 3 through 5, the housing 8 is a case that accommodates the terminal module 30 and the outer seal member 6, and supports the terminal module 30 (tubular shell 3) inserted therein. As the outer face of the terminal module 30 is constituted of the conductive tubular shell 3, in order to insulate the tubular shell 3 from the outside of the connector module 10, the housing 8 is formed of an insulator (non-conductive) material such as a resin.

The housing 8 includes a cylindrically-shaped tubular portion 8A and an outer circumferential portion 8B protruding in an annular form from the tubular portion 8A to the radial outer side R2. In the inner circumferential face of the tubular portion 8A, there are provided the plurality of (four for this embodiment) engaging pawls 81a protruding from the base end portions thereof on the first terminal portion 11 side along the first direction L and protruding, on the leading ends thereof, to the radial inner side R1. As described above, these engaging pawls 81a are engaged with the second engaging recess portion 32 of the tubular shell 3. The surface of the outer circumferential portion 8B is exposed to be flush with the outer face of the connector case 10A. By providing e.g. laser welding work on the outer circumferential portion 8B, the connector case 10A and the connector 10B (housing 8) will be fixed to each other in a water-tight manner.

The tubular portion 8A includes, with the outer circumferential portion 8B as a border therebetween, a first cylindrical portion 81 on the first terminal portion 11 side along the first direction L and a second cylindrical portion 82 on the second terminal portion 12 side along the first direction L. In the outer circumferential face of the second cylindrical portion 82, there are formed a plurality of (two for this embodiment) engaging protruding portions 83 protruding on the radial outer side R2 with which the rotation-preventing mechanism 5 comes into engagement. These engaging protruding portions 83 each include stepped portions 83a into which a second rotation-preventing member 5B (described later) comes into contact and protruding engaging portions 83b further protruding on the radial outer side R2 on the opposed sides (see FIG. 4). In the inner circumferential face of the second cylindrical portion 82, there is formed a seal recess portion 84 in which the outer seal member 6 will be fitted. This outer seal member 6 is disposed to come into contact with the seal recess portion 84 acting as the bottom of the housing 8 in the first direction L. The outer seal member 6 too is an annular member having elasticity (elastic member), like the inner seal member 4.

The above-described inner seal member 4 comes into pressed contact with the inner circumferential face of the tubular shell 3 and the outer circumferential face of the center conductor 1, whereas the outer seal member 6 comes into pressed contact with the inner circumferential face of the housing 8 and the outer circumferential face of the tubular shell 3. This prevents intrusion of liquid to the cylindrical space E3 of the housing 8. Further, by providing e.g. laser welding work on the outer circumferential portion 8B, the connector case 10A and the connector 10B (housing 8) will be fixed to each other in a water-tight manner, thus preventing intrusion of liquid to the inside of the connector case 10A. In the case the connector module 10 is used in the camera unit 100 as a vehicle-mounted camera as provided for this embodiment, the sealing using the inner seal member 4 and the outer seal member 6, etc. will be effective. Namely, the camera unit 100 as a vehicle-mounted camera will often be used, for example, for driving or steering assistance or recording of traveling conditions. In such a case, the camera unit 100 will often be mounted on the exterior of the vehicle such as a bumper or a door. The exterior of the vehicle will often be subjected to splashing of water droplets and/or the like from, for example, rain, snow or a water pool on a road. Therefore, it is preferable to provide the connector module 10 with the water-proof property by proving the sealing arrangement described above.

As shown in FIGS. 3 and 4, the shield case 7, which includes a shield member 7A and a shield cover 7B, shields the inner space E2 against electromagnetic waves present in the outer space E1 of the shield case 7, e.g. electromagnetic waves such as electromagnetic noises that can influence, for example, signals transmitted via the center conductor 1 and/or the electronic circuit 102 of the camera module 110 (see also FIG. 5). To this end, the shield member 7A and the shield cover 7B too are each formed of a conductive material such as a metal. The description below uses the term "shield unit 7C" to refer to a combination of the tubular shell 3, the shield member 7A, and the shield cover 7B. The shield unit 7C serves to ensure high shielding performance and stable impedance characteristic when a high-frequency current is flown through the connector 10B.

Figure 7:
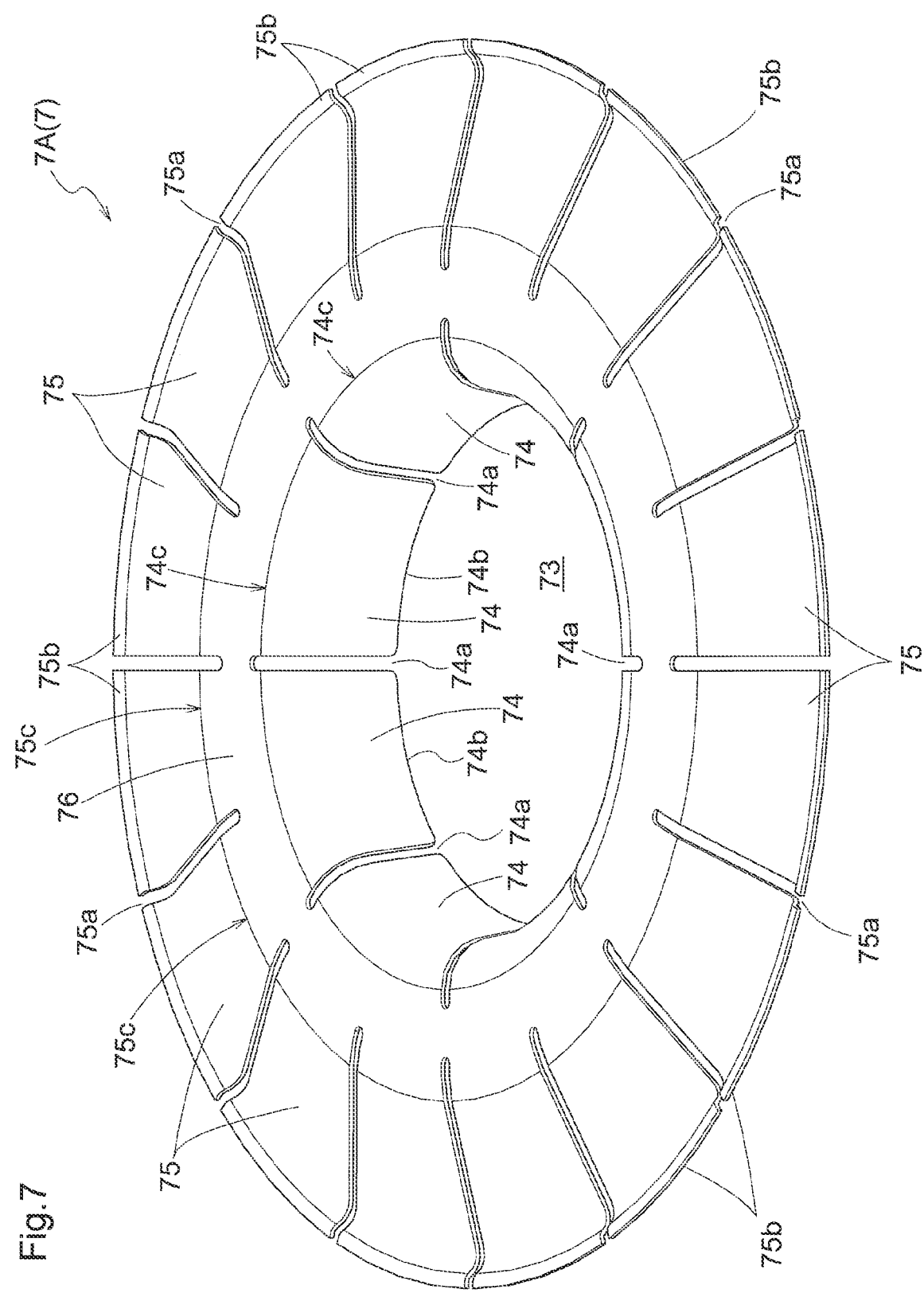
FIG. 7 is a perspective view of a shield member.
Figure 8:
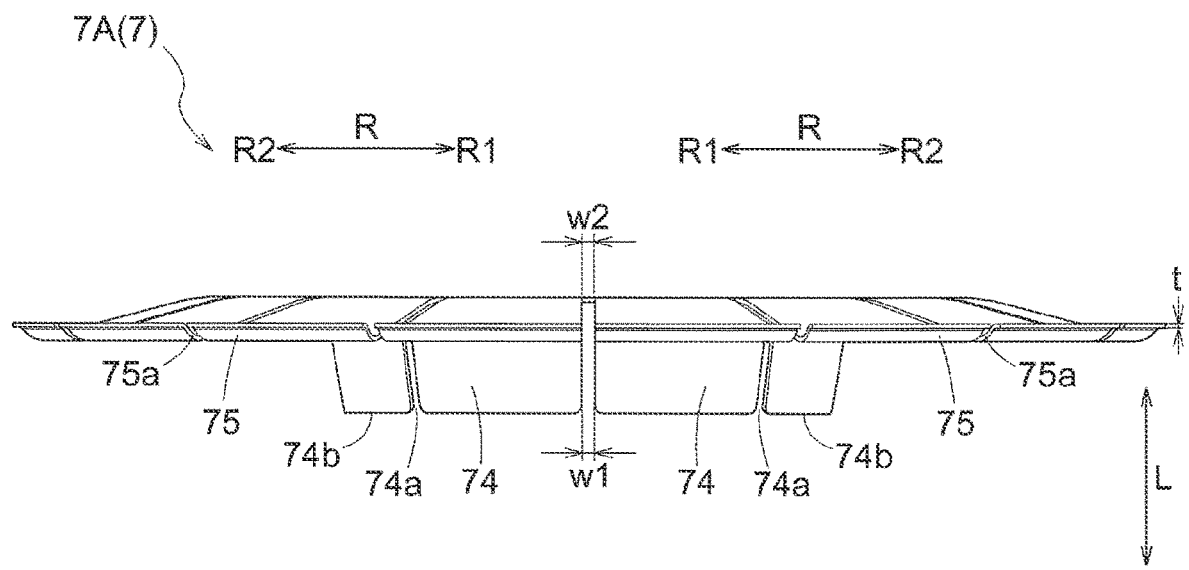
FIG. 8 is an elevational view of a shield member.
Figure 9:
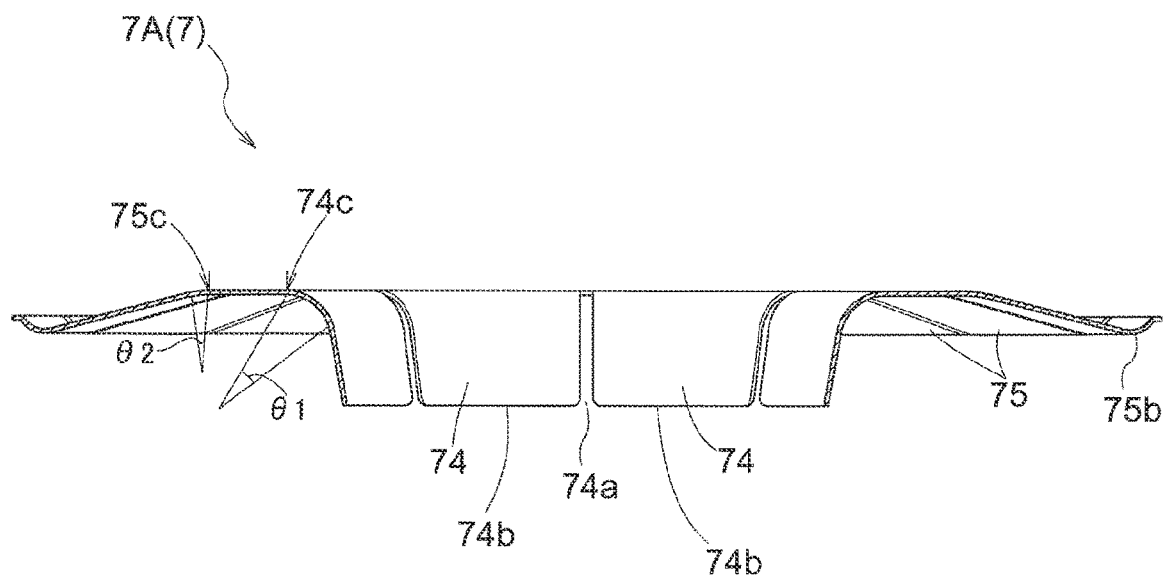
FIG. 9 is a vertical section of a shield member.

As shown in FIGS. 7 through 9, the shield member 7A is formed of a conductive material in an annular and flat-plate shape, and includes a plurality of (eight for this embodiment) first elastic portions 74 arranged annularly at an inner circumferential part and evenly spaced from one another, a plurality of (16 for this embodiment) second elastic portions 75 arranged annularly at an outer circumferential part and evenly spaced from one another, and an annular intermediate portion 76 present between the plurality of first elastic portions 74 and the plurality of second elastic portions 75 in the radial direction R. The plurality of first elastic portions 74 have respective circumferential widths equal to one another, and are elastically deformable. The plurality of second elastic portions 75 have respective circumferential widths equal to one another, and are elastically deformable. The shield member 7A is formed by press work on a flat plate.

The first elastic portions 74 are defined by a plurality of (eight for this embodiment) first slits 74a extending from an inner circumferential edge toward the radial outer side R2. The first elastic portions 74 each include a first curved part 74c, which is continuous with the intermediate portion 76, which extends from a base end part thereof, and which curves in the first direction L at a first central angle θ1 relative to the intermediate portion 76 in a flat-plate shape. The first elastic portions 74 define, on the radial inner side R1, a circular opening portion 73 through which the terminal module 30 (tubular shell 3) is present. When the terminal module 30 (tubular shell 3) is inserted through the opening portion 73, the plurality of first elastic portions 74 each become elastically deformed so that its inner end 74b comes into contact with a bottom portion 34a1 and one side wall 34a2 (which is an example of the outer circumferential portion of the tubular shell 3) of the third engaging recess portion 34a. This causes the shield member 7A and the tubular shell 3 to become electrically connected to each other (see also FIG. 5). The first elastic portions 74 for this embodiment are present in the number of eight, but may alternatively be present in the number of seven or fewer, or nine or more. Further, the plurality of first elastic portions 74 are arranged annularly at an inner circumferential part and evenly spaced from one another. The first elastic portions 74 may, however, alternatively be spaced from one another unevenly. The first elastic portions 74 may have respective circumferential widths different from one another.

The second elastic portions 75 are defined by a plurality of (16 for this embodiment) second slits 75a extending from an outer circumferential edge toward the radial inner side R1. The second elastic portions 75 each include a second curved part 75c, which is continuous with the intermediate portion 76, which extends from a base end part thereof, and which curves in the first direction L at a second central angle θ2 relative to the intermediate portion 76. The first curved part 74c of each first elastic portion 74 and the second curved part 75c of each second elastic portion 75 are curved in the same direction relative to the intermediate portion 76. The first central angle θ1 of each first curved part 74c is larger than the second central angle θ2 of each second curved part 75c. Since each first elastic portion 74 (first curved part 74c) and each second elastic portion 75 (second curved part 75c) are curved in the same direction, the first elastic portions 74 and the second elastic portions 75 extend in the same direction. This allows the shield member 7A to have a small thickness as a whole, as compared to a case in which first elastic portions 74 and second elastic portions 75 are curved in respective directions opposite to each other.

The second elastic portions 75 each include a leading end portion 75b curved in that direction relative to the intermediate portion 76 which is opposite to the direction in which each second curved part 75c is curved. Each leading end portion 75b has a curved surface capable of coming into contact with the shield cover 7B. The second elastic portions 75 thus form a gap G1 in the first direction L (hereinafter referred to simply as "gap G1") between the intermediate portion 76 of the shield member 7A and the shield cover 7B (see FIG. 5). As described above, the inner end 74b of each of the plurality of first elastic portions 74 is in contact with the outer circumferential portion of the tubular shell 3, while the curved surface of the leading end portion 75b of each second elastic portion 75 is in contact with the shield cover 7B. This allows the shield case 7 and the terminal module 30 (tubular shell 3) to be electrically connected to each other. The second elastic portions 75 for this embodiment are present in the number of 16, but may alternatively be present in the number of 15 or fewer, or 17 or more. Further, the plurality of second elastic portions 75 are arranged annularly at an outer circumferential part and evenly spaced from one another. The second elastic portions 75 may, however, alternatively be spaced from one another unevenly. The second elastic portions 75 may have respective circumferential widths different from one another.

For this embodiment, each first slit 74a has a slit width w1, and each second slit 75a has a slit width w2, both slit widths w1 and w2 being not larger than twice the plate thickness t of the shield member 7A. The slit widths w1 and w2 of the first slits 74a and second slits 75a may alternatively be each larger than twice the plate thickness t of the shield member 7A.

The shield member 7A for this embodiment is arranged such that the first central angle θ1 of each first curved part 74c is larger than the second central angle θ2 of each second curved part 75c. The first elastic portions 74 are thus curved more than the second elastic portions 75 relative to the intermediate portion 76. This allows each first elastic portion 74 and each second elastic portion 75 to cause respective contact pressures in respective directions different each other. Specifically, the plurality of first elastic portions 74 are each elastically deformed so that its inner end 74b is in contact with the bottom portion 34a1 and one side wall 34a2 of the third engaging recess portion 34a as a side surface of the tubular shell 3. This allows each first elastic portion 74 to cause a contact pressure in the radial direction R. Further, the second elastic portions 75 each include a leading end portion 75b having a curved surface in contact with a bottom portion 71 of the shield cover 7B. This allows each second elastic portion 75 to cause a contact pressure in the first direction L.

The shield member 7A for this embodiment is arranged such that the plurality of first slits 74a each have a slit width w1, and the plurality of second slits 75a each have a slit width w2, both slit widths w1 and w2 being not larger than twice the plate thickness t and thus small. The first elastic portions 74 and the second elastic portions 75 are thus large in area in a plan view. This increases the area of contact between the first elastic portions 74 and the tubular shell 3 and the area of contact between the second elastic portions 75 and the shield cover 7B, thereby ensuring stable electric connection.

Further, the shield member 7A is large in area. This allows the impedance characteristic to be stable when a high-frequency current is flown through the center conductor 1 and shield unit 7C of the connector 10B, and reduces emission of noise to the outside of the shield unit 7C. In addition, the shield unit 7C has an increased shielding effect, which reduces the influence of outside noise on the high-frequency current.

The shield cover 7B is a bottomed rectangular tubular case and includes a rectangular bottom portion 71 orthogonal to the first direction L (along the extension direction of the center conductor 1) and a side wall portion 72 bent from the circumference of the bottom portion 71 and extending along the first direction L. At the center of the bottom portion 71, there is formed a circular opening portion 71a through which the terminal module 30 (tubular shell 3) extends, and on the radial inner side R1 of that inner circumferential portion of the bottom portion 71 which defines the opening portion 71a, each first elastic portion 74 is located and the curved surface of the leading end portion 75b of each second elastic portion 75 comes into contact with the portion of the bottom portion 71 on more radial outer side R2 than the opening portion 71a. In a pair of first corner portions 71b located on a diagonal line of the bottom portion 71, cutouts are formed. Near the cutout of each first corner portion 71b, there is formed a pin insertion hole 71c in which a stopper pin P will be inserted for preventing inadvertent withdrawal of the shield cover 7B from the connector case 10A. Further, in a pair of second corner portions 71d located on the diagonal line different from that of the pair of first corner portions 71b of the bottom portion 71, there are formed therethrough protrusion insertion holes 71d1 in which stopper protrusions T formed in the connector case 10A (described later) are to be inserted. The side wall portion 72 extends vertically along the first direction L in correspondence with the shape of the bottom portion 71.

As shown in FIGS. 3 through 5, the rotation-preventing mechanism 5 includes a first rotation-preventing member 5A and a second rotation-preventing member 5B. These first rotation-preventing member 5A and second rotation-preventing member 5B are each formed of an insulator (non-conductive) material such as a resin. The rotation-preventing mechanism 5 is disposed between the connector case 10A and the shield case 7, and comes into engagement with the housing 8, thus preventing rotation of this housing 8. The first rotation-preventing member 5A is a ring-like member formed of a pair of curved portions 51 and a pair of straight portions 52. At the centers of the straight portions 52, there are formed a pair of block portions 52a protruding on the radial outer side R2. At the center of the face of each of the pair of block portions 52a on the side of the connector case 10A, there is formed a groove 52b along the radial direction R. The second rotation-preventing member 5B is provided in the form of a ring formed integrally of a pair of U-shaped members 53 arranged in reverse from each other and joined to each other. In an inner circumferential face of each U-shaped member 53, there are formed, as cutouts, engaging recess portions 53a with which the protruding engaging portions 83b of the housing 8 described above are engaged. In outer side faces of a pair of corner portions on a diagonal line of the second rotation-preventing member 5B, there are formed depression portions 55 depressed in L-shape.

The first rotation-preventing member 5A prevents rotation of the housing 8 relative to the connector case 10A, as the grooves 52b in the block portions 52a are engaged and fixed in position relative to a protruding portion 15b1 (described later) of the connector case 10A, and the engaging protruding portions 83 of the housing 8 are placed in opposition to the straight portions 52. Further, the second rotation-preventing member 5B prevents rotation of the housing 8 relative to the connector case 10A, as the depression portions 55 are engaged and fixed in position with first bulging portions 15c (described later) of the connector case 10A, and the protruding engaging portions 83b of the housing 8 are engaged with the engaging recess portions 53a as being in contact with the stepped portions 83a formed in the second cylindrical portion 82 of the housing 8. In this way, thanks to the first rotation-preventing member 5A and the second rotation-preventing member 5B, rotation of the housing 8 relative to the connector case 10A can be prevented in a reliable manner. However, the rotation-preventing mechanism 5 may include only either one of the first rotation-preventing member 5A and the second rotation-preventing member 5B.

As shown in FIG. 3, the connector case 10A is a box-like member having the bottom portion 15 and the side walls 16 each formed of an insulator (non-conductive) material such as a resin. In an outer face of the bottom portion 15, there is formed an annular recess portion 15a as an annular-shaped groove in which the outer circumferential portion 8B of the housing 8 is to be inserted. At the center of this annular recess portion 15a, there is formed an insertion hole portion 15a1 in which the second cylindrical portion 82 of the housing 8 is to be inserted. As described above, when the outer circumferential portion 8B is inserted to the annular recess portion 15a, the surface of the outer circumferential portion 8B will be in flush with the outer face of the connector case 10A. By providing e.g. laser welding work on the outer circumferential portion 8B, the connector case 10A and the connector 10B (housing 8) are fixed to each other in a water-tight manner. At a pair of corner portions located on a diagonal line of the outer faces of the side walls 16, there are formed, as cutouts, bolt accommodating portions 16a in which heads of bolts B will be fitted and there are formed therethrough screw holes Ba into which the bolts B are to be threaded.

As shown in FIG. 4, in the inner face of the bottom portion 15, there is formed a circumferential groove portion 15b along the outer circumferential face of the first rotation-preventing member 5A. At a position of this circumferential groove portion 15b corresponding to each groove 52b of the first rotation-preventing member 5A, there is formed, as a protrusion, a protruding portion 15b1 engageable with the groove 52b. At the corner portions located on the diagonal line of the inner faces of the side walls 16, there are formed a pair of first bulging portions 15c having engaging holes Pa in which the stopper pins P will be engaged. At the corner portions in the inner faces of the side walls 16 located on the different diagonal line from that of the pair of first bulging portions 15c, there are formed a pair of second bulging portions 15d having stopper protrusions T engageable with protrusion insertion holes 71d1 of the shield cover 7B.

An assembled article in which the above-described terminal module 30 and shield case 7 have been accommodated and fixed to the housing 8 and the connector case 10A is a connector module 10 in a narrow sense of the term. This connector module 10 in the narrow sense of the term with addition of the main body case 9 thereto may also be referred to as the connector module 10. In the case of such inclusion of the main body case 9, there is possibility of the camera module 110 being accommodated in the main body case 9. In this latter case, the connector module 10 will be understood to be substantially synonymous with the camera unit 100. Therefore, the assembled article of the terminal module 30 and the shield case 7 accommodated and fixed to the housing 8 and the connector case 10A, the intermediate assembled article including the main body case 9 additionally, and the camera unit 100 accommodating the camera module 110 can all correspond to the connector module 10.

Figure 6:
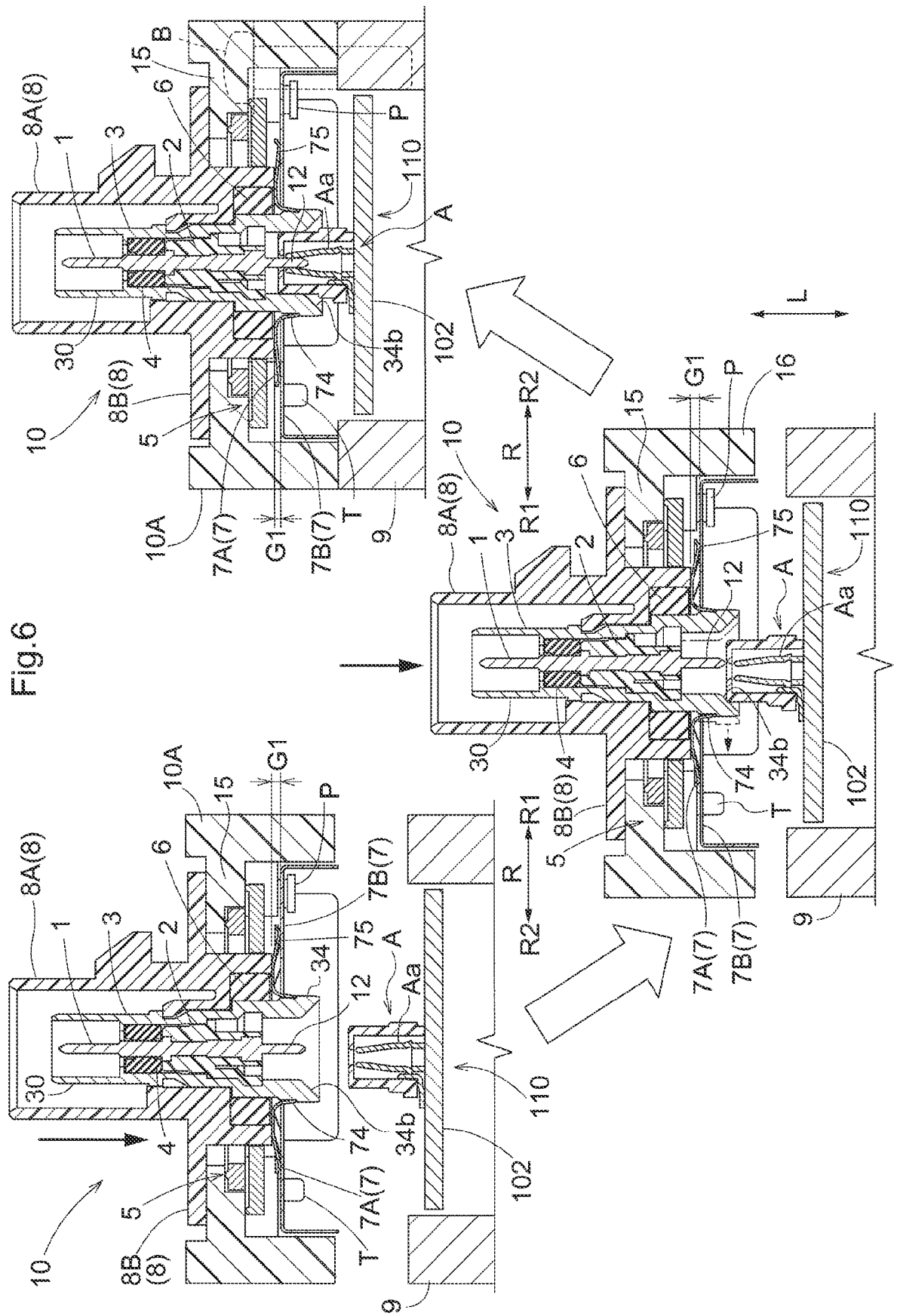
FIG. 6 is a vertical section showing a state of connecting a connection target instrument to a connector module.

FIG. 6 illustrates a mode of electrically connecting the camera module 110 to the above-described narrowly defined connector module 10 relating to the first embodiment. As shown in FIG. 4, the terminal module 30, the outer seal member 6, the connector case 10A, the first rotation-preventing member 5A, the second rotation-preventing member 5B, and the shield member 7A and the shield cover 7B will be assembled in this mentioned order from the side of the second cylindrical portion 82 of the housing 8, and then the shield cover 7B will be fixed to the connector case 10A via the stopper pins P, whereby the connector module 10 is fabricated. As shown in FIG. 6, the tubular end portion 34 of the tubular shell 3 of this connector module 10 will be brought closer to the receptacle A having a conductor Aa electrically connected to the circuit board on which the electronic circuit 102 is formed. If the axis of the conductor Aa of the receptacle A is displaced or deviated in the radial direction R relative to the axis of the tubular shell 3, the receptacle A will come into contact with the tapered face 34b formed in the inner circumferential face of the tubular end portion 34 of the tubular shell 3.

As the connector module 10 and the receptacle A are bought further closer to each other, the tapered face 34b and the receptacle A will come into contact with each other, and the terminal module 30, the housing 8, and the rotation-preventing mechanism 5 will be moved along the tapered face 34b relative to the connector case 10A in the radial direction R. Further, the shield member 7A engaged with the tubular shell 3 will be moved relative to the shield cover 7B (which is fixed to the connector case 10A with use of the actions of the stopper pins P and the stopper protrusions T) while in contact therewith in such a manner as to be slidable in the radial direction R. Since the curved surface formed at the leading end portion 75b of each second elastic portion 75 of the shield member 7A is placed in contact with the shield cover 7B in the state where the gap G1 is present, the terminal module 30 (tubular shell 3), the housing 8, etc. will be moved smoothly in the radial direction R relative to the connector case 10A, whereby the axis of the tubular shell 3 and the axis of the conductor Aa of the receptacle A will be bought into agreement, and both the center conductor 1 (second terminal portion 12) and the conductor Aa will be electrically connected. In this state, by providing e.g. laser welding work on the outer circumferential portion 8B of the housing 8, the connector case 10A and the connector 10B (housing 8) will be fixed to each other in a sealing manner. Finally, the connector case 10A and the main body case 9 will be fastened to each other via the plurality of bolts B. The shield cover 7B placed in contact with the main body case 9 will be pushed up, and the second elastic portions 75 will be elastically deformed in such a manner as to reduce the gap G1 between the shield member 7A and the shield cover 7B, thus rendering the contact between the shield member 7A and the shield cover 7B more reliable.

The shield member 7A for this embodiment is arranged such that each first elastic portion 74 is engaged with the tubular shell 3 and that the curved surface formed on the leading end portion 75b of each second elastic portion 75 is in contact with the shield cover 7B. Thus, even if the shield member 7A is, for example, vibrated, the first elastic portions 74 and the second elastic portions 75 are elastically deformed to absorb the shock. This allows, for example, the tubular shell 3 and the shield cover 7B to have increased durability.

The shield case 7 for this embodiment includes the shield member 7A and the shield cover 7B. In the shield member 7A, there are formed the second elastic portions 75 capable of coming into contact with the shield cover 7B. Further, in the connector 10B before the connector case 10A is fixed to the main body case 9 via the bolts B, the gap G1 is formed in the first direction L between the intermediate portion 76 of the shield member 7A and the shield cover 7B by the second elastic portions 75 formed in the shield member 7A. Namely, with flexible deformation of the second elastic portions 75, the shield member 7A can be moved relative to the shield cover 7B. As a result, even if there is a displacement or deviation between the respective axes of the receptacle A and the connector 10B at the time of attaching the receptacle A to the connector 10B, the shield member 7A engaged via the first elastic portions 74 with the tubular shell 3 covering the center conductor 1 is moved together with the tubular shell 3, allowing alignment with correction of the displacement.

Furthermore, when the connector case 10A is fixed to the main body case 9 via the bolts B, in the connector 10B, thanks to the elastic deformation of the second elastic portions 75, the gap G1 between the shield member 7A and the shield cover 7B will be reduced, thus establishing electric connection between the shield member 7A and the shield cover 7B. Consequently, the connector module 10 for this embodiment can ensure high shielding performance.

In the case where the annular shaped outer circumferential portion 8B fixed to the outer face of the connector case 10A is formed in the housing 8 as provided for this embodiment, this outer circumferential portion 8B can be easily fixed to the connector case 10A by laser welding. In addition, even when a load is applied to the connector 10B due to e.g. vibration, this is received by the connector case 10A and the housing 8, so load application between the conductor members (the center conductor 1, the tubular shell 3, the shield case 7) of the connector 10B and the electronic circuit 102 of the camera module 110 can be suppressed. Further, with provision of the rotation-preventing mechanism 5 for preventing the rotation of the housing 8 as provided for this embodiment, positioning of the housing 8 can be carried out reliably, and the operation of fixing the housing 8 with the connector case 10A can be carried out easily.

[Variation of Shield Member]

Figure 10:
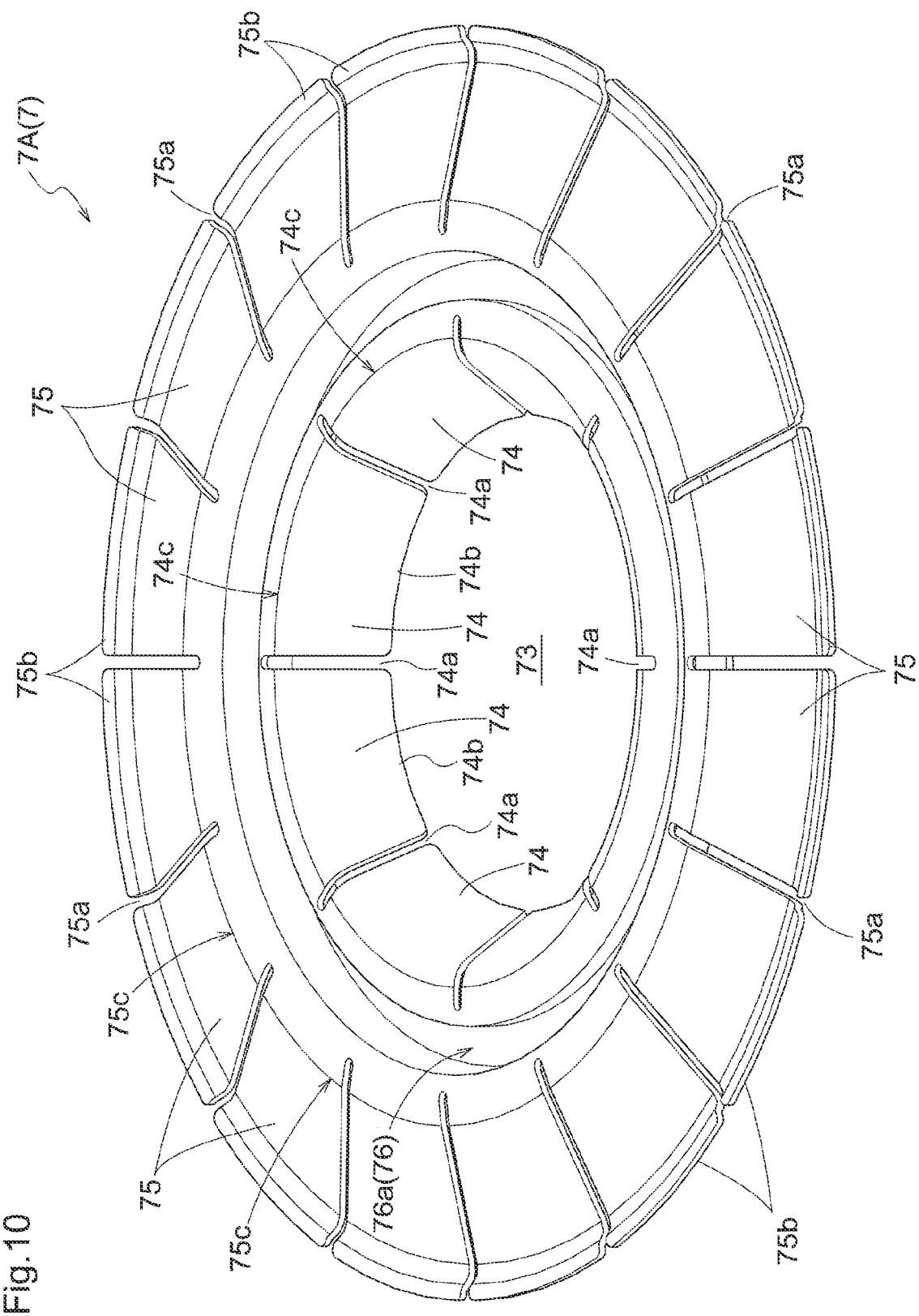
FIG. 10 is a perspective view of a shield member according to a variation.
Figure 11:
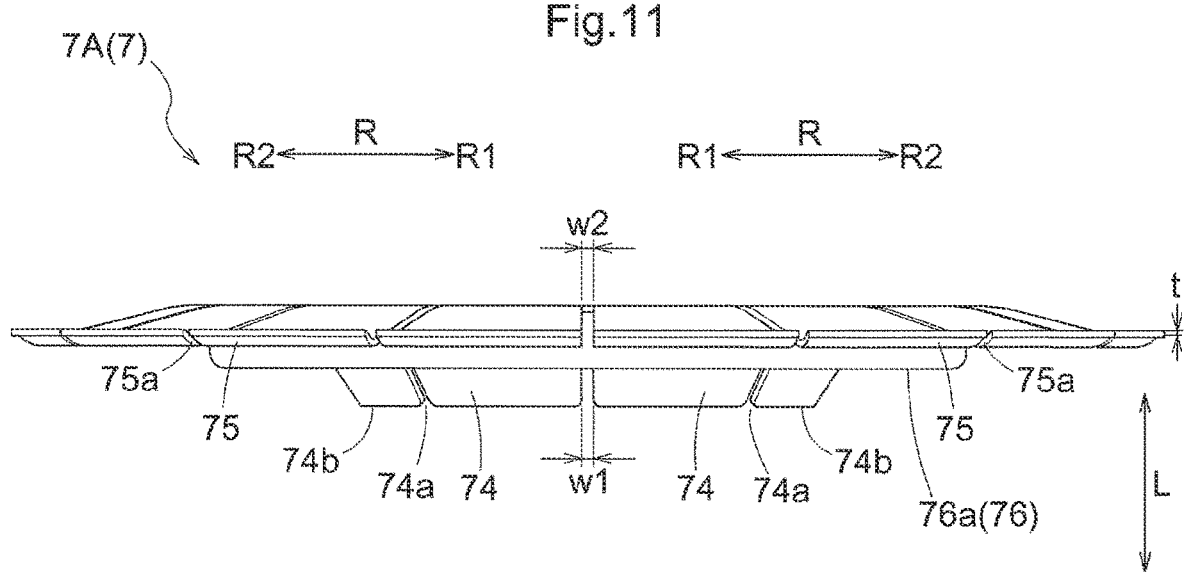
FIG. 11 is an elevational view of a shield member according to a variation.
Figure 12:
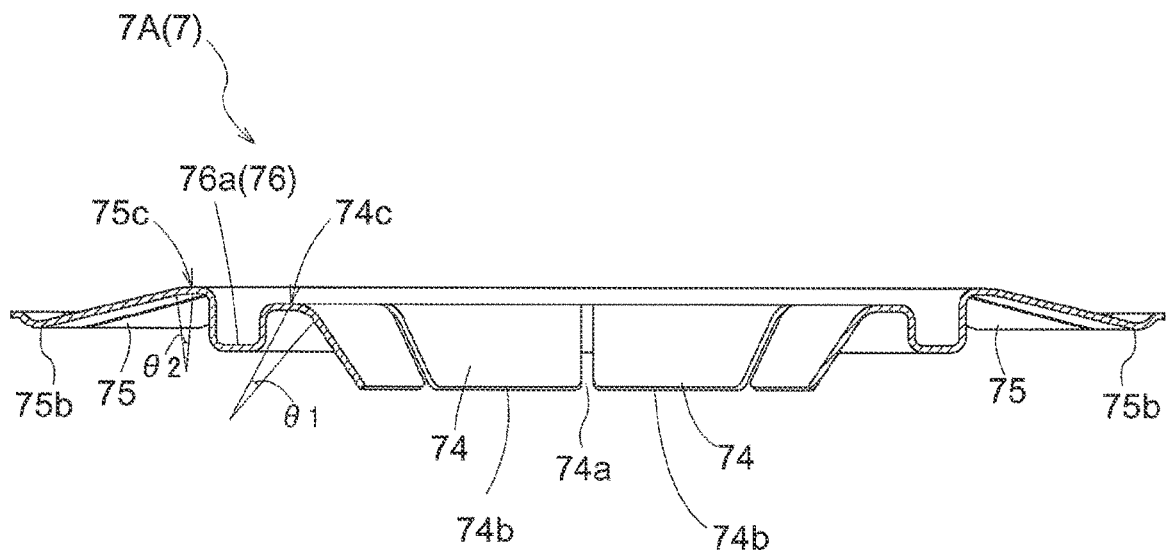
FIG. 12 is a vertical section of a shield member according to a variation.

FIGS. 10 through 12 illustrate a variation of the shield member 7A. The shield member 7A as this variation differs from the shield member 7A for the embodiment described above in that the former includes an intermediate portion 76 that does not have the shape of a flat plate, but has a reinforcement portion 76a depressed in the same direction as the curving direction of the first elastic portions 74 and the second elastic portions 75. The reinforcement portion 76a is an annular groove having a U-shaped cross section, and has a bottom face and two side faces. That one of the two side faces which is on the radial inner side R1 is lower in height than the side face on the radial outer side R2. Further, the first elastic portions 74 for this variation each have a length in the radial direction R (spring length) smaller than that of each first elastic portion 74 for the embodiment described above.

The shield member 7A as this variation includes an intermediate portion 76 having a reinforcement portion 76a. This increases the strength (rigidity) of the intermediate portion 76. The shield member 7A will thus not become deformed even if a large force has been generated at the first elastic portions 74 and/or the second elastic portions 75 as a result of having a high rate of spring or becoming elastically deformed by a large amount. Even if, for instance, the inner end 74b of each first elastic portion 74 has come into contact with the bottom portion 34a1 and one side wall 34a2 of the third engaging recess portion 34a of the tubular shell 3 with a high contact pressure, the shield member 7A, which includes an intermediate portion 76 with a high strength, will not become deformed by the contact pressure. This allows the first elastic portions 74 to maintain a high contact pressure against the tubular shell 3.

[Alternative Embodiments]

(1) The embodiment described above is arranged such that the inner end 74b of each first elastic portion 74 is in contact with the bottom portion 34a1 and one side wall 34a2 of the third engaging recess portion 34a of the tubular shell 3. The embodiment may, however, alternatively be arranged such that a portion of each first elastic portion 74 other than the inner end 74b (for example, a central portion thereof) is also in contact with the bottom portion 34a1 of the third engaging recess portion 34a. There is no particular limit on the contact portion that ensures electric connection between the first elastic portions 74 and the third engaging recess portion 34a. The first curved part 74c of each first elastic portion 74 may be curved relative to the intermediate portion 76 in a direction opposite to the direction in which the second curved part 75c of each second elastic portion 75 is curved.

(2) With omission of the rotation-preventing mechanism 5, a positioning protrusion or the like maybe provided in the outer circumferential portion 8B of the housing 8.

(3) In the housing 8 described above, the tubular portion 8A is formed cylindrical. Instead, it may be formed like an angular tube having a polygonal cross section. In the housing 8 described above, the outer circumferential portion 8B is formed annular. Instead, it may be formed polygonal.

(4) The connector module 10 described above is not limited to a coaxial connector, but maybe a multiple-pole differential connector.

The invention claimed is:

1. A shield unit, comprising:
an electrically conductive tubular shell;
a shield member, comprising:
a plurality of first elastic portions made of a conductive material and arranged annularly in a plate shape at an inner circumferential part of the shield member;
a plurality of second elastic portions arranged annularly at an outer circumferential part of the shield member; and
an intermediate portion between the plurality of first elastic portions and the plurality of second elastic portions, wherein
the plurality of first elastic portions are defined by a plurality of first slits each extending from an inner circumferential edge of the shield member in a radial direction of the shield member, and
the plurality of second elastic portions are defined by a plurality of second slits each extending from an outer circumferential edge of the shield member in the radial direction;
the shield member being fitted around the tubular shell such that the plurality of first elastic portions of the shield member are in contact with the tubular shell for electric connection of the shield member with the tubular shell; and
an electrically conductive shield cover with which the plurality of second elastic portions of the shield member are capable of coming into contact.

2. The shield unit according to claim 1, wherein
the plurality of first elastic portions each include a base end part having a first curved part curved relative to and continuous with the intermediate portion,
the plurality of second elastic portions each include a base end part having a second curved part curved relative to and continuous with the intermediate portion, and
the first curved part has a first central angle, and the second curved part has a second central angle, the first central angle being larger than the second central angle.

3. The shield unit according to claim 2, wherein the first curved part is curved in a direction identical to a direction in which the second curved part is curved.

4. The shield unit according to claim 2, wherein the plurality of second elastic portions each include a leading end portion curved in a direction opposite to a direction in which the second curved part is curved relative to the intermediate portion.

5. The shield unit according to claim 3, wherein the plurality of second elastic portions each include a leading end portion curved in a direction opposite to the direction in which the second curved part is curved relative to the intermediate portion.

6. The shield unit according to claim 1, wherein the plurality of first slits each have a first slit width, and the plurality of second slits each have a second slit width, each of the first slit width and the second slit width being not larger than twice a plate thickness of the shield member.

7. The shield unit according to claim 2, wherein the plurality of first slits each have a first slit width, and the plurality of second slits each have a second slit width, each of the first slit width and the second slit width being not larger than twice a plate thickness of the shield member.

8. The shield unit according to claim 3, wherein the plurality of first slits each have a first slit width, and the plurality of second slits each have a second slit width, each of the first slit width and the second slit width being not larger than twice a plate thickness of the shield member.

9. The shield unit according to claim 4, wherein the plurality of first slits each have a first slit width, and the plurality of second slits each have a second slit width, each of the first slit width and the second slit width being not larger than twice a plate thickness of the shield member.

10. The shield unit according to claim 5, wherein the plurality of first slits each have a first slit width, and the plurality of second slits each have a second slit width, each of the first slit width and the second slit width being not larger than twice a plate thickness of the shield member.

11. The shield unit according to claim 1, wherein the intermediate portion is in an annular shape, and has a reinforcement portion along an entire circumference thereof.

12. The shield unit according to claim 2, wherein the intermediate portion is in an annular shape, and has a reinforcement portion along an entire circumference thereof.

13. The shield unit according to claim 3, wherein the intermediate portion is in an annular shape, and has a reinforcement portion along an entire circumference thereof.

14. The shield unit according to claim 4, wherein the intermediate portion is in an annular shape, and has a reinforcement portion along an entire circumference thereof.

15. The shield unit according to claim 6, wherein the intermediate portion is in an annular shape, and has a reinforcement portion along an entire circumference thereof.

16. The shield unit according to claim 7, wherein the intermediate portion is in an annular shape, and has a reinforcement portion along an entire circumference thereof.

17. The shield unit according to claim 8, wherein the intermediate portion is in an annular shape, and has a reinforcement portion along an entire circumference thereof.

18. The shield unit according to claim 9, wherein the intermediate portion is in an annular shape, and has a reinforcement portion along an entire circumference thereof.

19. A connector module electrically connectable to a connection target instrument, the connector module comprising:
 a connector case fixable with use of a fastener member to a main body case containing the connection target instrument; and
 a connector fitted in the connector case, wherein
 the connector includes:
  an electrically conductive contact;
  an electrically insulating holder in which the contact is fitted and which supports the contact;
  an electrically conductive tubular shell surrounding an outer surface of the holder;
  an electrically insulating housing in which the tubular shell is fitted and which supports the tubular shell;
  a shield member comprising:
 a plurality of first elastic portions made of a conductive material and arranged annularly in a plate shape at an inner circumferential part of the shield member;
 a plurality of second elastic portions arranged annularly at an outer circumferential part of the shield member; and
 an intermediate portion between the plurality of first elastic portions and the plurality of second elastic portions, wherein the plurality of first elastic portions are defined by a plurality of first slits each extending from an inner circumferential edge of the shield member in a radial direction of the shield member, and
 the plurality of second elastic portions are defined by a plurality of second slits each extending from an outer circumferential edge of the shield member in the radial direction;
 the shield member being fitted around the tubular shell such that the plurality of first elastic portions of the shield member are elastically deformed and in contact with the tubular shell for electric connection of the shield member with the tubular shell; and
 an electrically conductive shield cover against which the plurality of second elastic portions of the shield member are capable of being pressed, and
 with the connector case fixed to the main body case with use of the fastener member, the plurality of second elastic portions of the shield member are elastically deformed and pressed against the shield cover for electric connection of the shield member with the shield cover.

* * * * *